Patented Sept. 23, 1924.

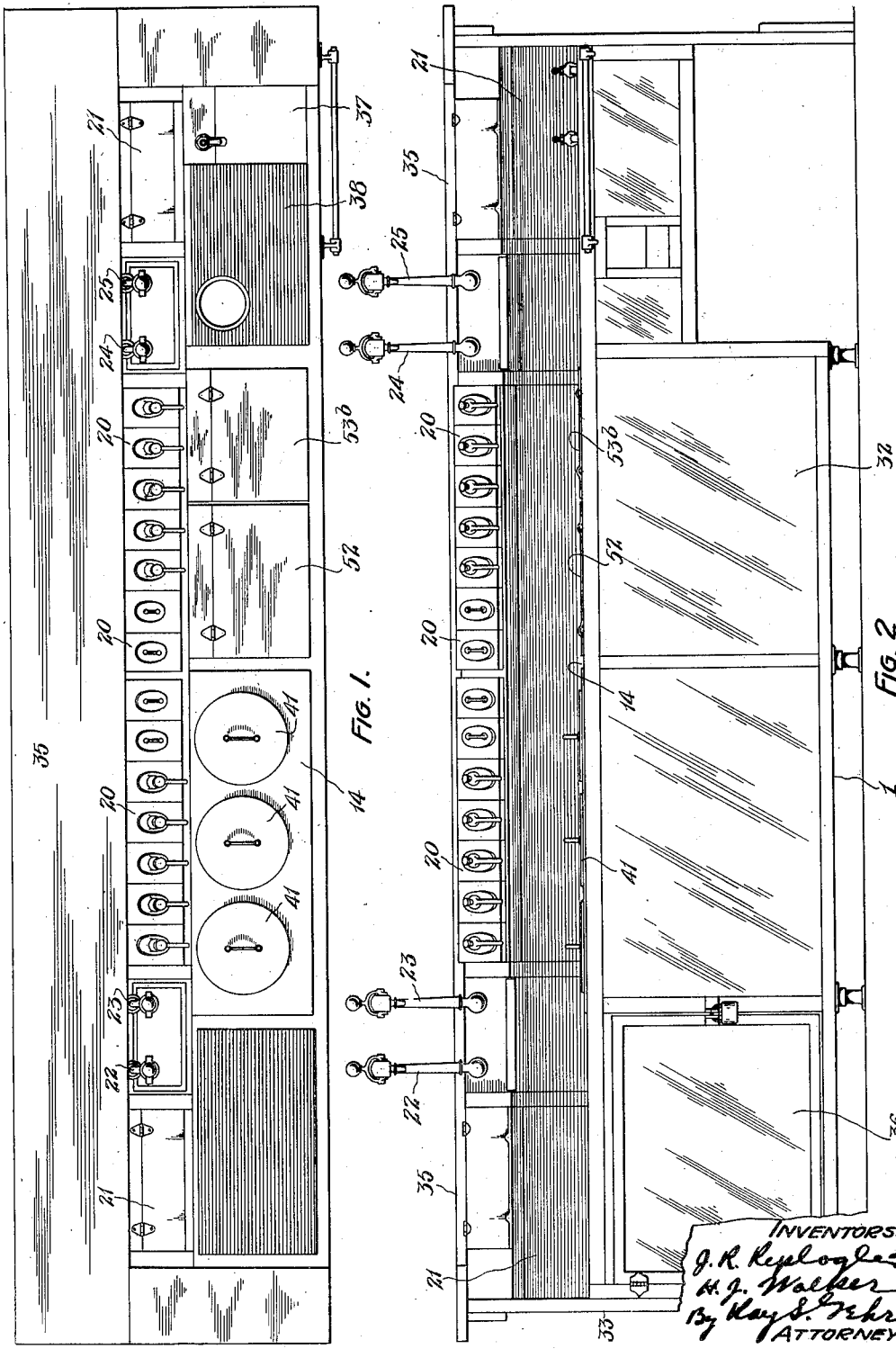

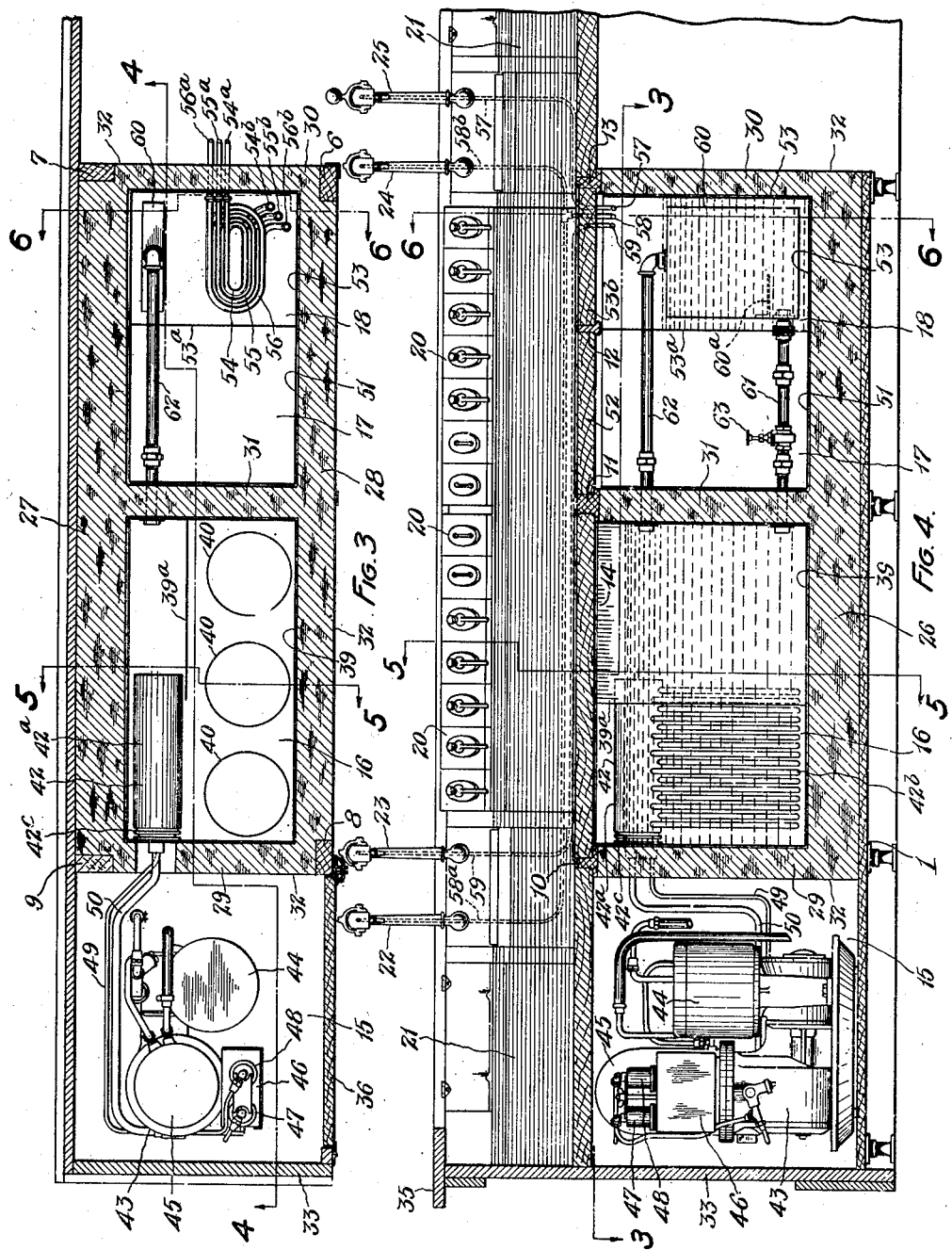

1,509,812

UNITED STATES PATENT OFFICE.

JOHN R. REPLOGLE, OF DETROIT, MICHIGAN, AND HARRY J. WALKER, OF CHICAGO, ILLINOIS; SAID REPLOGLE ASSIGNOR TO NIZER LABORATORIES COMPANY, OF DETROIT, MICHIGAN, A CORPORATION OF MICHIGAN.

REFRIGERATED FOOD AND DRINK DISPENSING CABINET AND METHOD OF COOLING LIQUIDS.

Application filed September 6, 1923. Serial No. 661,136.

*To all whom it may concern:*

Be it known that we, JOHN R. REPLOGLE and HARRY J. WALKER, citizens of the United States, residing, respectively, at Detroit, in the county of Wayne and State of Michigan, and at Chicago, in the county of Cook and State of Illinois, have invented certain new and useful Improvements in and Relating to Refrigerated Food and Drink Dispensing Cabinets and Methods of Cooling Liquids, of which the following is a specification, reference being made therein to the accompanying drawings.

The invention relates to what are commonly known as soda fountains such as are used for the dispensing of ice-cream soda, ice cream, and various forms of drinks.

In soda fountains for dispensing both ice-cream and drinks, as heretofore constructed, it has been customary to provide one or more "holes" for the reception of bulk ice-cream cans with a surrounding compartment in which a cracked ice and salt mixture is packed to keep the cream hard; and in addition a compartment has been provided for coils through which the various liquids or drinks on draft are passed, this compartment being kept cold either by crushed ice or, as in the so-called "iceless fountain," by the cooling effect of the salt and ice mixture in the adjacent ice-cream compartment. There have been some instances also in which soda fountains have had their various sections or compartments cooled by direct expansion coils or by brine coils of mechanical refrigeration plants. In some of these cases the brine coils of the fountain have been connected with the brine system of large refrigeration plants installed in the building. In other cases, the direct expansion coils or the brine coils of the fountain have been connected with a refrigerant compressor plant separate from the fountain but designed to serve only the fountain.

In none of these various prior systems, whether ice-cooling or mechanical refrigeration was employed, has there been satisfactory provision for the maintenance of suitably different temperatures in the different sections or compartments of the fountain. To keep ice-cream hard a lower temperature is required than is permissible in connection with soda water and other drinks without freezing them. Thus in the case of the "iceless" fountains, the lack of suitable temperature control for the various sections has resulted sometimes in the freezing of the soda water or other drinks in the coils when the draft of these liquids happens to be infrequent. And in the case of the mechanically refrigerated fountains heretofore employed, the maintenance of different suitable temperatures in the different sections of the fountain has been dependent upon the supervision of an attendant, with the result that freezing of the soda water coils occurred when there was a lack of close supervision. In the case of fountains cooled by brine coils connected with a large refrigeration system, since the temperature requisite for keeping ice-cream hard is below that requisite for many other services, it has been difficult to induce the refrigeration engineer in charge to maintain the low temperature suitable for the ice-cream service.

One of the principal objects of the present invention is the provision of a self-contained fountain comprising a compartment for solid food such as ice-cream, a cooling compartment for drinks on draft, preferably also a dry cold compartment for bottled goods or other products to be maintained at a low temperature, and an automatically controlled refrigeration apparatus adapted without attention to maintain the several compartments at different suitably low temperatures, as well as the usual soda fountains adjuncts, such as receptacles for crushed fruit flavors, syrups, cracked ice, and dishwashing facilities.

Another object of the invention is the provision of improved means for maintaining a suitable low temperature of soda water and other liquids on draft without danger of freezing such liquids in the draft pipes.

Another object of the invention is the provision of a fountain having an ice-cream section and a soda water section automatically maintained at suitably different low temperatures by means of a common mechanical refrigerating apparatus.

A further object of the invention is the provision of a fountain such as that last referred to above in which a dry compartment for bottled goods is provided and automatically maintained at a suitably low temperature above the freezing point of water.

A further object of the invention is the provision of an improved method of cooling liquids on draft, said method being characterized by an inherent automatic temperature control.

Other objects of the invention more or less ancillary or incidental to the foregoing will appear from the following description in connection with the drawings.

In the drawings, Fig. 1 is a plan view of a fountain embodying our improvements.

Fig. 2 is a rear elevation of the fountain.

Fig. 3 is a horizontal sectional view of the fountain, the section being taken on the line 3—3, Fig. 4, and some of the parts being broken away at one end of the fountain.

Fig. 4 is a vertical section on the line 4—4, Fig. 3.

Figure 5:
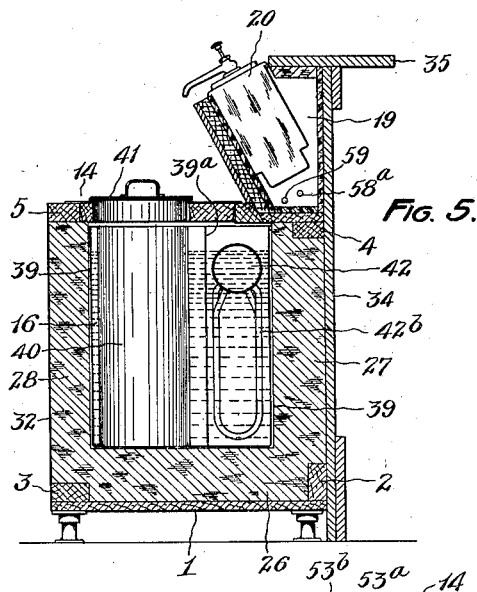
Fig. 5 is a section on the lines 5—5, Figs. 3 and 4.

Referring in detail to the construction illustrated, the fountain has a suitable frame structure comprising a bottom wall 1, on which are arranged longitudinal frame members 2 and 3, longitudinal top frame members 4 and 5 which are supported by suitable uprights 6, 7, 8 and 9 from said lower frame members 2 and 3. The longitudinal frame members 4 and 5 carry transverse frame members 10, 11, 12 and 13 (see Fig. 4) and these latter with the longitudinal members 4 and 5 and other suitable frame parts, not shown, support the main top wall of the fountain, which is designated in its entirety by 14 and which is made up in part of stationary sections and in part of movable sections of wood or other heat insulating material, as will later be explained.

Looking at the fountain from the rear it has at the left end a machine section or compartment 15 which houses a motor-driven compressor and a condenser of a mechanical refrigerating apparatus, adjacent the machine section on the right a food section 16 to hold ice-cream, next to said food section a cold chamber or compartment 17 for bottled goods and the like and at the right end of the cabinet a section 18 for cooling liquids on draft, all of these sections being below the main top wall 14. At the front side of the cabinet and extending practically throughout its length is a longitudinal trough-like compartment 19 which is arranged to receive the usual dispensing jars 20, 20 for flavoring syrups and crushed fruits, as well as boxes 21, 21 fitted with hinged lids and adapted to hold cracked ice. On this longitudinal compartment 19 are mounted the usual draft arms 22, 23, 24 and 25 fitted with the usual hand valves for the draft of soda water, drinking water, ginger ale, or the like.

The series of compartments 16, 17 and 18 is surrounded by a bottom wall 26, front and rear walls 27 and 28 and end walls 29 and 30 of cork or other suitable heat-insulating material. The sections 16 and 17 are also separated by a wall 31 of cork or the like. The walls 28, 29 and 30 are provided with suitable sheet metal covers 32, 32.

The left end of the cabinet is preferably closed by a finishing wall or slab 33 of marble, opal glass, or the like. Similarly the front of the cabinet is finished with a wall 34 of marble or opal glass and the top of this wall carries a counter-like slab 35 of similar material. The rear side of the machine compartment 15 is provided with an opening closed by a suitable door 36. At the right end of the fountain is provided the usual dishwashing sink 37 with drain board 38.

Referring now in greater detail to the features to which our improvements more especially relate, the food section 16 comprises a tank 39 of sheet copper or other suitable metal adapted to hold an antifreezing solution such as brine or a mixture of alcohol and water. For convenience we shall hereafter sometimes refer to the said solution as brine. Extending downward into this tank are three cylindrical opentopped chambers 40, 40 adapted to receive five-gallon cans of bulk ice-cream.

The cylindrical sleeves constituting the walls of these chambers extend from the top to the bottom of the tank 39 and are thus surrounded by the cooling solution, as shown in Fig. 5. Above these compartments 40 the top wall 14 is formed with similar openings adapted to receive correspondingly shaped covers 41, 41 of the usual sort. Two of the compartments 40 are separated from the front wall of the tank 39 by a partition 39ª, which extends the full depth of the tank and performs a function which will later be explained.

Toward the front side and near the left end of the tank 39, and immersed in the antifreezing solution therein, is the vaporizer 42 of a mechanical refrigeration apparatus. As far as the present invention is concerned, this vaporizer may be of any desired or suitable construction. The one illustrated is like that of the refrigeration apparatus disclosed in the pending application Serial No. 475,344, filed June 6, 1921, of John R. Replogle, one of these applicants, and in Letters Patent to France, No. 547,971 to which reference may be had for a detailed showing and description of the vaporizer and the compressor mechanism associated with it. For the purpose of the present invention it is sufficient to note that the vaporizer comprises a header 42ᵃ and a series of depending circulating tubes 42ᵇ. One end of the header 42ᵃ is formed by a head casting 42ᶜ having a flange which is secured with a liquid-tight joint to the edge of an aperture in the adjacent end wall of the tank 39.

In the compartment of the machine section 15 of the fountain is mounted the power-driven compressor and the condenser mechanism of the refrigeration apparatus. This mechanism, which is illustrated in outline only, may be of any known suitable construction, that illustrated being substantially the same as that shown in the aforesaid application Serial No. 475,344 and in the aforesaid Letters Patent to France No. 547,971. In so far as the present invention is concerned, it will be sufficient to note that the mechanism comprises a compressor 43, driven through suitable reduction gearing by an electric motor 44, a condenser 45, electric switch mechanism 46, pressure devices 47 and 48 for automatically actuating this switch mechanism and suitable refrigerant connections 49 and 50 between the condenser, vaporizer, compressor, and pressure devices 47 and 48. The pressure devices 47 and 48 are responsive to temperature changes in the anti-freezing solution in the tank 39 and are adapted to maintain the temperature of this solution at a temperature well below 32° F. suitable for keeping ice-cream in the chambers 40 hard. As above indicated, any suitable automatic refrigeration apparatus adapted to perform this function can be used in so far as the present invention is concerned.

The section 17 for cooling bottled goods and the like comprises an open-top sheet metal tank 51 to which access is readily had by the hinged cover 52 which constitutes part of the top wall 14 of the cabinet.

The section 18 for cooling liquids on draft comprises an open-top sheet metal tank 53 to which, similarly, access is afforded by a hinged cover 53ᵇ, the tanks 51 and 53 having a common sheet metal wall 53ᵃ. The tank 53 is filled with water to about the level indicated in Fig. 4. Immersed in the water in this tank are a series of three coils 54, 55 and 56 preferably nested one within the other, as illustrated. The ends, 54ᵃ, 55ᵃ, 56ᵃ, of these coils are connected with sources of supply of, say, ginger-ale, soda-water, and plain drinking water, while their other ends, 54ᵇ, 55ᵇ, 56ᵇ, are connected to conduits 57, 58 and 59, respectively. The conduit 57 is connected with the draft arm 25. The conduit 58 divides and its branches, 58ᵃ and 58ᵇ, lead to the draft arms 22 and 24, respectively, and the conduit 59 leads to the draft arm 23.

Near the front side of the tank 53 and spaced away from the coils 54, 55 and 56 is arranged a cooling fluid conduit section in the form of an upright flat box-like structure 60 of suitable sheet metal such as copper. The lower end of the conduit section 60 is connected by a pipe 61 with the lower part of the tank 39 of the food section of the fountain, and the upper end of the conduit section 60 is connected by a pipe 62 with the upper part of the tank 39, the arrangement being such that a thermal siphon flow of the cooling fluid will be set up through the pipe 61 and section 60 and the pipe 62. A deflector plate 60ᵃ is preferably provided in the conduit section 60, so that the cold solution entering through the pipe 61 is spread throughout the said section. The pipe 61 is fitted with a hand-operated gate valve 63 by which the flow of cooling solution can be more or less throttled.

In the operation of our improved fountain the automatic switch device 46 of the refrigerant compressor mechanism causes the operation of the latter whenever the temperature of the brine in the tank 39 of the food section 16, and consequently the temperature within the vaporizer 42, rises above a certain predetermined point. The operation of the compressor results in a lowering of the temperature of the brine in the tank 39 and when said temperature is reduced to a certain point the switch mechanism 46 is automatically opened and the operation of the compressor stopped. In this way, by the periodic operation of the compressor mechanism the temperature of the brine in the tank 39 is automatically maintained within certain relatively close limits well below the freezing point of water and suitable for keeping ice-cream in the compartments 40 in a satisfactory hard condition.

Figure 6:
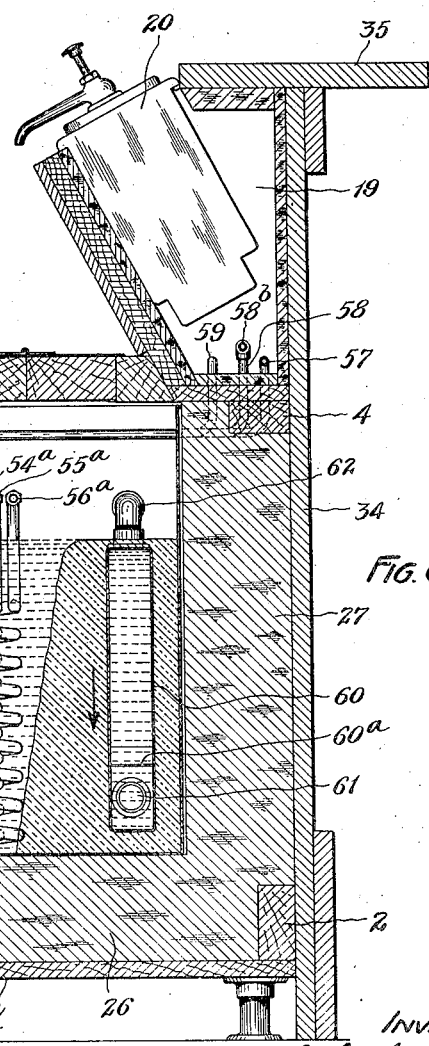
Fig. 6 is an enlarged section on the line 6—6, Fig. 3.

In the meantime, the absorption of heat by the brine conduit sections 61, 60, 62 from the fountain sections 17 and 18 results in a thermal siphon action causing a circulation of brine from the tank 39 through the pipe 61, box section 60 and pipe 62 back to the tank 39. As the brine, at a temperature well below the freezing point of water flows through the conduit section 60, the water in the tank 53, adjacent said tank on its side and end walls is cooled and flows downward toward the bottom of the tank, thus setting up convection currents in the tank over the coils 54, 55 and 56, as indicated by the arrows in Fig. 6. By giving the conduit section 60 the flat box form illustrated and disposing it near one side of the tank 53, a well defined convection current is set up and eddy currents, which would result from the use of an irregularly formed conduit section in lieu of the conduit section 60 illustrated, are avoided. Furthermore, the conduit section 60 serves in effect as a partition wall which partially cuts off the tank space on one side of it from that on its other side.

Since the temperature of the anti-freezing solution is well below 32° F. the temperature of the water in contact with the conduit section 60 is soon reduced to the freezing point and ice begins to form around the said section 60. After a time the ice thus formed completely fills the space between the front side of the conduit section 60 and the adjacent front wall of the tank 53, and also between the end walls of the section 60 and the adjacent side walls of tank 53 and between the bottom of the section 60 and the bottom wall of said tank. Thus circulation of water between the front and end walls of the conduit section 60 and the adjacent tank walls is entirely cut off and confined to the larger space between the rear side of the conduit section and the rear wall of the tank 53. This greatly reduces the heat-absorbing capacity of the conduit 60 as only the rear wall thereof remains available as a path for flow of heat from the water in the tank to the antifreezing solution. After the circulation is thus cut off between the front side of the conduit section 60 and the adjacent wall of the tank, the formation of ice on the other side of the section 60 continues for a time but, as ice is a poor conductor of heat, a point is finally reached at which heat cannot be absorbed from the water remaining in the tank 53 through the ice and into the brine in the conduit section 60 to a sufficient extent to cause further formation of ice. This slowing down and final stopping of the flow of heat from the water in the tank to the conduit 60, is furthered by the fact that the thermal siphon flow of the brine in the conduit 60 diminishes as the flow of heat from the water to the brine decreases, so that, as the layer of ice on the conduit 60 increases, there is both a decreased heat head and an increased resistance to heat flow between the water in the tank and the brine in the conduit. With the conduit section and the coils 54, 55 and 56 suitably disposed in relation to each other and the valve 63 properly set the formation of ice ceases before the ice encroaches materially upon said coils.

In this manner, the temperature of the water in the tank 53 is maintained approximately at or slightly above the freezing point by a method and an apparatus that are inherently automatic. Consequently, danger of freezing the liquids on draft in the cooling coils 54, 55, 56, is entirely obviated.

The formation of a definitely limited amount of ice in the tank 53 has the great advantage that when the amounts of liquids drawn through the cooling coils are relatively small, the maximum amount of ice which can form is produced, and a large reserve cooling capacity thus stored corresponding to the latent heat of the ice and this reserve cooling capacity thereafter becomes available when abnormally large drafts of soda water and other drinks are made.

The valve 63 is provided so that the apparatus can be adjusted to different operating conditions, such for example, as the conditions at different seasons of the year. With the valve 63 once adjusted for given conditions, no further supervision of the cooling of the liquid coils 54, 55, 56, is necessary. If the apparatus is to be used under fairly uniform conditions, the valve 63 can be omitted and the effective size of the cooling fluid conduit be proportioned to control the flow of the fluid, as will be readily understood.

The bottled goods section 17 of the fountain is kept amply cooled and at a sufficiently uniform temperature by the cold brine flowing through the pipes 61 and 62 and by the low temperature of the tank wall 53ª which has water and ice at approximately freezing temperature on one side of it. The cooling effect of the pipes 61, 62, and the wall 53ª is supplemented by the other side walls and the bottom wall of the tank 51 because these walls are in direct metal contact with the walls of the tank 53. In fact, in practice the two tanks are formed by placing a partition wall (53ª) across a single tank. Thus, it will be understood, considerable heat is absorbed from the walls of tank 51 by conduction through those walls to the walls of tank 53 which are in contact with the cold water therein.

The warmer brine returning through the pipe 62 into the tank 39 is prevented from coming into direct contact with the ice-cream chambers 40 by the partition 39ª which directs such warmer brine into direct contact with the vaporizer 42 by which it is cooled before contacting with the walls of said chambers 40.

It will now be understood that we have produced in a self-contained fountain structure cooling sections or compartments for (a) food such as ice-cream, (b) liquids on draft and (c) bottled goods or the like, and cooling and refrigerating apparatus which is adapted automatically to maintain the different suitable temperatures in the respective sections or compartments. The arrangement of the mechanical refrigeration apparatus in a section or compartment at one end of the fountain where access can be had to it readily and without preventing access to the other sections of the fountain and where it does not interfere with the desired relative arrangement of the food and drink section, will readily be appreciated. In this connection, it is observed that we do not in this application make claim to the relative arrangement of the machine section or compartment 15 at one end of the cabinet structure and adjacent to a food section with a brine tank and open-topped food chambers, as that feature of the fountain is the sole invention of John R. Replogle, and is disclosed and claimed in his Patent No. 1,476,546 granted upon application, Serial No. 576,477, filed July 21, 1922.

While we have illustrated and described a preferred embodiment of our improvements it is to be understood that the embodiment illustrated can be varied widely without departing from the invention as defined in the appended claims.

What we claim is:—

1. In drink dispensing apparatus, the combination in a unitary structure of a section for cooling liquids on draft comprising a water-holding tank, a coil immersed in the water in said tank adapted to be connected at one end with the source of supply of liquid and at its other end with the draft means of the apparatus, and a conduit for cooling fluid also immersed in said water; means for causing flow of cooling fluid through said conduit; and a section for bottled goods and the like disposed adjacent the water-holding tank and comprising a dry chamber separated from the water in said water-holding tank by a heat conducting wall.

2. In drink dispensing apparatus, the combination in a unitary structure of a section for cooling liquids on draft comprising a water-holding tank with metal walls, a coil immersed in the water in said tank adapted to be connected at one end with the source of supply of liquid and at its other end with the draft means of the apparatus, and a conduit for cooling fluid also immersed in said water; means for causing flow of cooling fluid through said conduit; and a section for bottled goods and the like disposed adjacent the water-holding tank and comprising a dry chamber having metal side and bottom walls directly connected to the walls of said water-holding tank and with one of its walls in direct contact with the water in the latter tank.

3. In drink dispensing apparatus, the combination of a section for cooling liquids on draft comprising a water-holding tank, a coil immersed in the water in said tank adapted to be connected at one end with the source of supply of liquid and at its other end with the draft means of the apparatus and a conduit for cooling fluid also immersed in said water; a section for bottled goods and the like comprising a dry chamber separated from the water in said water-holding tank by a heat-conducting wall; a supply conduit for cooling fluid extending through the said dry chamber and connected to the cooling fluid conduit immersed in the water; and means whereby cooling fluid is caused to flow through said supply and cooling fluid conduits.

4. In food and drink dispensing apparatus, the combination of a food section having a tank for holding cooled anti-freezing solution and a food chamber extending into said tank so as to be surrounded by said solution; means for cooling said solution; a section for cooling liquids on draft comprising a water-holding tank, a coil immersed in the water in said tank adapted to be connected at one end with the source of supply of liquid and at its other end with the draft means of the apparatus and a conduit for cooling fluid also immersed in said water; a conduit extending from the bottom part of the tank in the food section to and connected with the bottom part of the cooling fluid conduit in said water tank; a return conduit connected to the upper part of said cooling fluid conduit and extending to and communicating with the upper part of the tank in the food section; and a section for bottled goods and the like comprising a dry chamber separated from the water in said water-holding tank by a heat-conducting wall.

5. In food and drink dispensing apparatus, the combination of a food section having a tank for holding cooled anti-freezing solution and a food chamber extending into said tank so as to be surrounded by said solution; means for cooling said solution; a section for cooling liquids on draft comprising a water-holding tank, a coil immersed in the water in said tank adapted to be connected at one end with the source of supply of liquid and at its other end with the draft means of the apparatus and a conduit for cooling fluid also immersed in said water; a section for bottled goods and the like interposed between the other two sections and comprising a dry chamber separated from the water in said water-holding tank by a heat-conducting wall; a conduit extending from the bottom part of the tank in the food section to and connected with the bottom part of the cooling fluid conduit in said water tank; a return conduit connected to the upper part of said cooling fluid conduit and extending to and communicating with the upper part of the tank in the fluid section; and a manually adjustable valve in one of said cooling fluid conduits adapted to throttle the flow of cooling fluid through said conduits to any desired extent.

6. In food and drink dispensing apparatus, the combination of a food section having a tank for holding cooled anti-freezing solution and a food chamber extending into said tank; means for cooling said solution; a section for cooling liquids on draft comprising a water-holding tank, a coil immersed in the water in said tank adapted to be connected at one end with the source of supply of liquid and at its other end with the draft means of the apparatus and a conduit for cooling fluid also immersed in said water; a section for bottled goods and the like interposed between the other two sections and comprising a dry chamber separated from the water in said water-holding tank by a heat-conducting wall; a conduit connected with the lower part of the tank in the food section and extending through the said dry chamber into the water tank and connected with the bottom part of the cooling fluid conduit therein; and a return conduit connected with the upper part of the said cooling fluid conduit and extending through the said dry chamber to and in connection with the upper part of the tank in the food section.

7. In food and drink dispensing apparatus, the combination of a food section having a tank for holding cooled anti-freezing solution and a food chamber extending into said tank; means for cooling said solution; a section for cooling liquids on draft comprising a water-holding tank, a coil immersed in the water in said tank adapted to be connected at one end with the source of supply of liquid and at its other end with the draft means of the apparatus and a conduit for cooling fluid also immersed in said water; a section for bottled goods and the like interposed between the other two sections and comprising a dry chamber separated from the water in said water-holding tank by a heat-conducting wall; a conduit connected with the lower part of the tank in the food section and extending through the said dry chamber into the water tank and connected with the bottom part of the cooling fluid conduit therein; a return conduit connected with the upper part of the said cooling fluid conduit and extending through the said dry chamber to and in connection with the upper part of the tank in the food section; and a manually adjustable valve in one of said conduits extending through said dry chamber adapted to throttle the flow of cooling fluid therethrough to any desired extent.

8. In a food and drink dispensing cabinet, the combination in a unitary structure of a food section having a tank for holding anti-freezing solution, a refrigerant vaporizer disposed in said tank so as to be immersed in said solution, and a food chamber extending into said tank so as to be immersed in said solution; a refrigerant compressor section at one side of the food section comprising a power-driven refrigerant compressor and condenser apparatus operatively connected with the said vaporizer in the food section; a section for cooling liquids on draft disposed on the other side of the food section and comprising a water-holding tank, a coil immersed in the water in said tank adapted to be connected at one end with the source of supply of liquid and at its other end with the draft means of the cabinet, and a conduit for cooling fluid also immersed in said water; a separate section for bottled goods and the like comprising a dry chamber separated from the water in said water-holding tank by a heat-conducting wall; a conduit extending from the bottom part of the tank in the food section to and connected with the bottom part of the cooling fluid conduit in said water tank; and a return conduit connected to the upper part of said cooling fluid conduit and extending to and communicating with the upper part of the tank in the food section.

9. In apparatus for cooling liquids on draft, the combination of a water-holding tank, a coil immersed in the water in said tank and adapted to be connected at one end with the source of supply of liquid and at its other end with the draft means; a closed-circuit conduit for cooling fluid providing a path for free circulation of said fluid and having a section thereof extending through the water in said tank with an intervening space between it and said coil; and means for extracting heat from the cooling fluid in another section of said conduit to maintain its temperature below 32° F., whereby the absorption of heat by the cooling fluid from the water in the tank sets up a thermal siphon circulation of the cooling fluid through its conduit and causes the formation of ice around said conduit without freezing the liquid in the coil, the amount of ice formed and the circulation of the cooling fluid being automatically limited by the heat insulating property of the ice.

10. In apparatus for cooling liquids on draft, the combination of a water-holding tank, a coil immersed in the water in said tank and adapted to be connected at one end with the source of supply of liquid and at its other end with the draft means, a conduit for cooling fluid extending upward through the water in said tank and disposed at one side of said coil, said conduit comprising an upright flat box-like part, and means for causing a limited flow through said conduit of cooling fluid at a temperature below 32° F., whereby an automatically limited amount of ice is frozen around said conduit without freezing the liquid in said coil.

11. In apparatus for cooling liquids on draft, the combination of a water-holding tank, a coil immersed in the water in said tank and adapted to be connected at one end with the source of supply of liquid and at its other end with the draft means, a conduit for cooling fluid extending upward through the water in said tank and disposed at one side of said coil, said conduit comprising an upright flat box-like part disposed near but spaced from one side wall of the tank and with its bottom and narrower side walls spaced away from the bottom and side walls of the tank and its top wall below the upper level of the water in the tank, and means for causing a limited flow through said conduit of cooling fluid at a temperature below 32° F., whereby an automatically limited amount of ice is frozen around said conduit without freezing the liquid in said coil.

12. In food and drink dispensing apparatus, the combination of a food section having a tank for holding cooled anti-freezing solution and a food chamber extending into said tank so as to be surrounded by said solution; means for cooling said solution; a section for cooling liquids on draft comprising a water-holding tank, a coil immersed in the water in said tank adapted to be connected at one end with the source of supply of liquid and at its other end with the draft means of the apparatus and a conduit for cooling fluid also immersed in said water; a conduit extending from the bottom part of the tank in the food section to and connected with the bottom part of the cooling fluid conduit in said water tank; and a return conduit connected to the upper part of said cooling fluid conduit and extending to and communicating with the upper part of the tank in the food section.

13. In food and drink dispensing apparatus, the combination of a food section having a tank for holding cooled anti-freezing solution and a food chamber extending into said tank so as to be surrounded by said solution; means for cooling said solution; a section for cooling liquids on draft comprising a water-holding tank, a coil immersed in the water in said tank adapted to be connected at one end with the source of supply of liquid and at its other end with the draft means of the apparatus and a conduit for cooling fluid extending upward through the water in said tank with an intervening space between it and said coil; a conduit extending from the bottom part of the tank in the food section to and connected with the bottom part of the cooling fluid conduit in said water tank; and a return conduit connected to the upper part of said cooling fluid conduit and extending to and communicating with the upper part of the tank in the food section.

14. In food and drink dispensing apparatus, the combination of a food section having a tank for holding cooled anti-freezing solution and a food chamber extending into said tank so as to be surrounded by said solution; means for cooling said solution; a section for cooling liquids on draft comprising a water-holding tank, a coil immersed in the water in said tank adapted to be connected at one end with the source of supply of liquid and at its other end with the draft means of the apparatus and a conduit for cooling fluid extending upward through the water in said tank and disposed at one side of said coil, said conduit comprising an upright flat box-like part; a conduit extending from the bottom part of the tank in the food section to and connected with the bottom part of the cooling fluid conduit in said water tank; and a return conduit connected to the upper part of said cooling fluid conduit and extending to and communicating with the upper part of the tank in the food section.

15. In food and drink dispensing apparatus, the combination of a food section having a tank for holding cooled anti-freezing solution and a food chamber extending into said tank so as to be surrounded by said solution; means for cooling said solution; a section for cooling liquids on draft comprising a water-holding tank, a coil immersed in the water in said tank adapted to be connected at one end with the source of supply of liquid and at its other end with the draft means of the apparatus and a conduit for cooling fluid extending upward through the water in said tank and disposed at one side of said coil, said conduit comprising an upright flat box-like part disposed near but spaced from one side wall of the tank and with its bottom and narrower side walls spaced away from the bottom and adjacent side walls of the tank and its top wall disposed below the upper level of the water in the tank; a conduit extending from the bottom part of the tank in the food section to and connected with the bottom part of the cooling fluid conduit in said water tank; and a return conduit connected to the upper part of said cooling fluid conduit and extending to and communicating with the upper part of the tank in the food section.

16. In a food and drink dispensing cabinet, the combination of a food section having a tank for holding cooled anti-freezing solution and a food chamber extending into said tank so as to be surrounded by said solution; a section for cooling liquids on draft comprising a water-holding tank, a coil immersed in the water in said tank adapted to be connected at one end with the source of supply of liquid and at its other end with the draft means of the cabinet and a conduit for cooling fluid also immersed in said water and connected with the tank in the said food section to receive anti-freezing solution therefrom; means for maintaining the temperature of the anti-freezing solution of the food compartment at a point materially below the freezing point of water, and means for controlling the flow of said solution through said cooling fluid conduit.

17. In apparatus for cooling liquids on draft, the combination of a water-holding tank comprising bottom and side walls; a coil immersed in the water in said tank and adapted to be connected at one end with the source of supply of liquid and at its other end with the draft means; an interior partition-like structure disposed in the tank between the coil and a side wall of the tank and constructed and arranged to permit circulation of the water in the tank from one side to the other of the partition-like structure; and means for maintaining one of the said structure and side wall parts at a temperature below 32° F. to absorb heat from the water in the tank and cause the formation of ice between said structure and side wall and thereby stop the said circulation of water.

18. In apparatus for cooling liquids on draft, the combination of a water-holding tank comprising bottom and side walls; a coil immersed in the water in said tank and adapted to be connected at one end with the source of supply of liquid and at its other end with the draft means; an interior partition-like structure disposed in the tank between the coil and a side wall of the tank with its top below the level of the top of the tank and an intervening space between its bottom and the bottom wall of the tank so as to permit circulation of water from one side to the other of partition-like structure; and means for maintaining one of the said structure and side wall parts at a temperature below 32° F. to absorb heat from the water in the tank and cause the formation of ice between said structure and side wall and thereby stop the said circulation of water.

19. The method of cooling liquid on draft which comprises passing the liquid through a coil immersed in a tank of water, passing a cooling fluid at a temperature below 32° F. by thermal siphon action through a conduit immersed in said water with an intervening space between the coil and conduit until the water surrounding the conduit freezes, and automatically regulating the thermal siphon flow of the cooling fluid by the heat insulating property of the ice frozen around the conduit to stop the further formation of such ice before it encroaches sufficiently upon the said coil to freeze the liquid on draft.

20. The method of cooling liquids on draft which comprises passing the liquid through a coil immersed in a tank of water, causing a cooling fluid at a temperature below 32° F. to flow by thermal siphon action through a conduit immersed in said water with an intervening space between the coil and conduit until the water surrounding the conduit freezes, and regulating the flow of said cooling fluid so that the formation of ice around said conduit is automatically stopped before it encroaches sufficiently upon the said coil to freeze the liquid on draft.

21. The method of cooling liquid on draft which comprises passing the liquid through a coil immersed in a tank of water, passing a cooling fluid at a temperature below 32° F. through a conduit immersed in said water adjacent the wall of the tank and with an intervening space between it and the said coil until the water surrounding the conduit freezes and cuts off thermal circulation of the water between said conduit and the said tank wall, and regulating the flow of said cooling fluid so that the formation of ice around the conduit is automatically stopped before it encroaches sufficiently upon the said coil to freeze the liquid on draft.

In testimony whereof, we hereunto affix our signatures.

JOHN R. REPLOGLE.
HARRY J. WALKER.